Jan. 17, 1961
K. R. SKINNER
2,968,688
RAIN SENSOR
Filed April 10, 1958
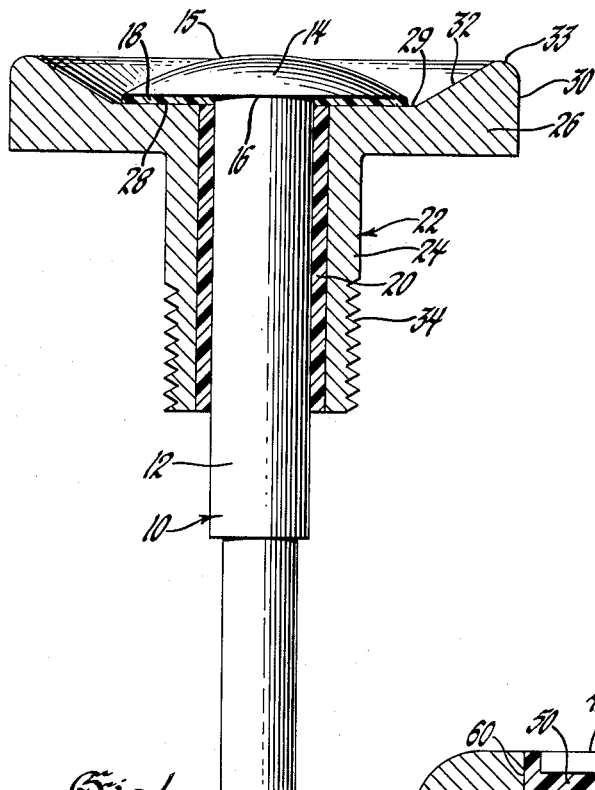
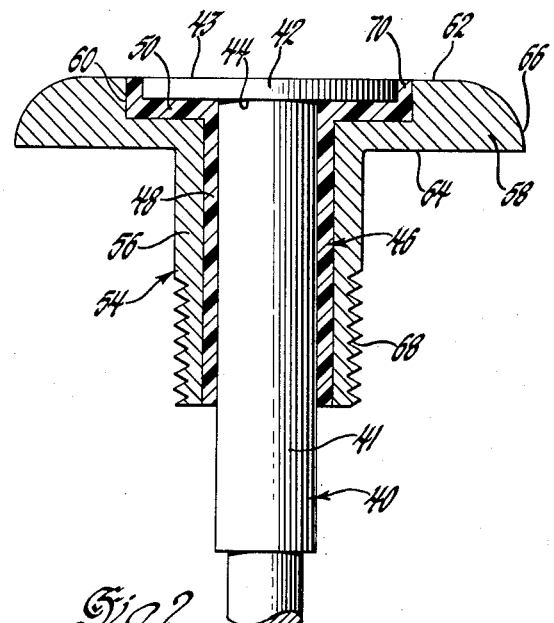
INVENTOR.
Kenneth R. Skinner
BY
W. J. Pettigrew
ATTORNEY

United States Patent Office 2,968,688
Patented Jan. 17, 1961

2,968,688

RAIN SENSOR

Kenneth R. Skinner, Anderson, Ind., assignor to General Motors Corporation, Detroit, Mich., a corporation of Delaware Filed Apr. 10, 1958, Ser. No. 727,732

4 Claims. (Cl. 136—90)

This invention relates to rain sensors and more particularly to rain sensors for use in control systems for automatically raising a vehicle top or windows, or both, in response to atmospheric moisture conditions.

There are many known control systems for automatically raising a vehicle top or windows, or both, in response to atmospheric moisture conditions. Each of these systems generally includes a rain sensor which is placed in the system between the battery and a control member of the system, such as a sensitive relay, and which is actuated by atmospheric moisture to in turn actuate the control system. In the past the rain sensors have usually been of the type including spaced metallic members which are secured to a support and which are adapted to be bridged by rain or other moisture so as to connect the control system to the battery. These metallic members have usually been of the same metallic material.

This invention is directed to rain sensors of this general type for use in automatic vehicle top or window raising systems for raising a vehicle top or windows or both in response to atmospheric moisture conditions. The rain sensors of this invention in their preferred embodiments include a pair of metallic members which are separated by an insulating material. The metallic materials of the metallic members belong to the group of metals known as the electromotive series, with one of the metallic materials being spaced from the other of the metallic materials in the series whereby the metallic materials generate a voltage when the insulating material is bridged by at least one drop of water which electrically connects the metallic members.

The primary object of this invention is to provide an improved rain sensor. Another object of this invention is to provide an improved rain sensor which includes a pair of metallic members separated by an insulating material, with the metallic members being of metallic materials belonging to the class known as the electromotive series and being spaced apart with respect to each other in the series. A further object of this invention is to provide an improved rain sensor which includes a pair of metallic members separated by an insulating material, with the metallic members being of metallic materials belonging to the electromotive series, and being spaced apart in the series so as to generate a voltage when the metallic members are electrically connected by at least one drop of water bridging the insulating material. Yet another object of this invention is to provide an improved rain sensor which includes a pair of spaced metallic members separated by an insulating material, with the metallic members being of metallic materials belonging to the electromotive series and with the members including means for collecting at least one drop of water and positioning this drop of water so as to bridge the insulating material and thereby electrically connect the metallic members of the rain sensor.

These and other objects will be readily apparent from the following specification and drawings, wherein:

Figure 1 is a view, partially in section, of a rain sensor according to one preferred embodiment of this invention; and Figure 2 is a view, partially in section, of a rain sensor according to another preferred embodiment of this invention.

It is well known that any two dissimilar active metals in the electromotive series will generate a small potential when the two metals are separated by a suitable electrolyte. The amount of generated voltage is determined primarily by the location of the two metals with respect to each other in the series. Thus, the further that the two metals are separated from each other in the series, the greater will be the generated voltage. This invention makes use of this property of metals which belong to the electromotive series in providing an improved rain sensor. The rain sensor of this invention generally includes two metallic members which are spaced apart from each other by an insulating material, with the metallic members being of metallic materials belonging to the electromotive series and being spaced apart from each other in the series so as to generate a voltage in the order of from .15 to .5 volt when the metallic members are bridged by at least one drop of water. Preferably one of the metallic members is of either silver or cadmium and the other of the metallic members is of either zinc or Monel metal. Monel metal is an alloy which includes from 66 to 86% nickel, 2 to 4% iron, 2% manganese and the remainder copper. Each of the metals of this alloy is located below cadmium in the electromotive series of metals.

While one of the members may be of silver and the other of the members may be of zinc, this combination of metals has certain disadvantages. Silver and zinc are two very active metals in the electromotive series, and this is very ideal as far as generated voltage is concerned. However, since the rain sensor is exposed to the atmosphere, the silver will oxidize as will the zinc, and this may cause the rain sensor to have an unsightly appearance. Silver is also expensive, and additionally, a rain sensor of these metals is more sensitive to corrosion than a rain sensor of other metals, since the more active the two metals are in the electromotive series, the greater the generated voltage and consequently the greater the corrosion. Thus, although silver and zinc may be used with a high degree of success in the rain sensor of this invention, there are certain disadvantages to the use of these two metals.

From the foregoing, it can be seen that there are certain standards which the two metals must meet in order to provide a successful rain sensor. The metals must have a lustrous surface which is lasting in use, they must be active enough to produce the sensitivity or voltage required, and yet the corrosion of the metals must be kept to a minimum. I have found that Monel metal and cadmium easily meet each of the above-mentioned standards and therefore are more preferably used than zinc and silver.

Referring now to Figure 1 of the drawings, one preferred embodiment of this invention will be described. One metallic member 10 of cadmium includes a shank portion 12 and an integral head 14, the upper surface 15 of which is generally spherically shaped and the lower surface 16 of which is flat. Although not shown in the drawings, the lower end of the member 10 is adapted to be connected to the control member, such as the sensitive relay, of a common automatic vehicle top or window raising system. A flat washer 18 of nylon, polyethylene, or Mylar fits on the shank 12 of member 10 against the flat surface 16 of the head thereof and is generally coextensive with the head, as may be seen in the drawings. Any of the above-mentioned materials are suitable for use in rain sensors since each is an insulator and each is not substantially affected by moisture or other elements in the atmosphere. A tubular insulator 20 fits on the shank 12 of member 10 in engagement with the washer 18. The tubular insulator 20 may be made of the same materials as the washer 18, although this is not necessary. If desired, the washer 18 and the insulator 20 may be formed integral with each other. It can be seen that the washer 18 is very thin, preferably from .002 to .005 inch thick. Since sensitivity of the rain sensor is affected by the spacing between the metallic members, it is preferable that the spacing be kept to a minimum to increase sensitivity.

The other metallic member 22 of Monel metal includes a tubular shank 24 and an integral head 26. The head 26 includes an upper flat circular surface 28 which is slightly larger in diameter, such as from .002 to .004 inch, than the diameter of the head 14 of member 10 and washer 18. Surface 28 is joined to the outer circular side surface 30 of the head by an outwardly flaring or sloping annular surface 32 and arcuate edge surface 33. Surfaces 28 and 32 define a depression in the head 26 of member 22, with surface 28 defining the base wall of the depression and surface 32 defining the side wall of the depression. When the parts are assembled, the surface 28 of the head of member 22 engages the washer 18 so as to be spaced from the surface 16 of the head 14 of member 10, while the shank 24 of member 22 slidably receives the insulator 20 and shank 12 of member 10. The shank 24 may be threaded at 34 so as to provide a means for mounting the rain sensor on a suitable support. Either the shank 24 or the head 26 of member 22 is electrically connected to the negative terminal of the vehicle battery.

Since the members 22 and 10 are normally insulated from each other, a potential applied to the member 22 will normally not be conducted to the member 10. In a rain sensor having member 10 of cadmium and member 22 of Monel metal, with the members being separated by a nylon washer 18 which is .002 to .005 inch thick, the dry resistance of the sensor is very high in megamegohms. Thus, if there is no rain or other moisture in the atmosphere, the rain sensor will not connect the battery to the automatic vehicle top or window raising system. Assume now that at least one drop of moisture falls on either the spherically shaped upper surface 15 of member 10 or the outwardly flaring annular surface 32 of the member 22. From the shape of these surfaces, it can be seen that the drop of water will move off of the surface 15 of member 10, or downwardly along surface 32 and be positioned on the edge portion of surface 15 of head 14 and on the annular exposed surface portion 29 of surface 28 and on the lower edge portion of surface 32, so as to bridge the insulating washer 18 separating members 10 and 12. Thus, the members 10 and 22 will be electrically connected and will generate a voltage in the order of from .15 to .5 volt, the resistance of the rain sensor being greatly reduced from megamegohms to from 500 to 1000 ohms, depending on the amount of corrosion on the surface 15 of head 14 and on the surface portion 29 of surface 28. Although this is a low voltage, it is additive to the applied potential and therefore ample current is supplied to close a sensitive relay or other control member of the automatic vehicle top or window control system.

It can be seen that initially the resistance of the rain sensor is very high and that this resistance is reduced to from 500 to 1000 ohms upon the members 10 and 12 being electrically connected so that galvanic action occurs. When the members are initially electrically connected, the resistance drops slightly as the galvanic action starts. Thereafter, the resistance begins to drop even more as the galvanic action continues, and, the longer the period of time that the galvanic action occurs between the members, the greater the reduction in resistance until the resistance has dropped to from 500 to 1000 ohms. Due to this continual drop in resistance during the galvanic action, it will be understood that more of the applied battery potential will be available to operate the sensitive relay or other control member of the automatic top or window raising system, since there will be a smaller voltage drop across the rain sensor. The applied potential which is available for the sensitive relay or control member from the vehicle battery is also augmented by the voltage generated by the rain sensor.

Tests have been conducted on rain sensors made of various materials to determine the amount of current flowing through the sensor. One such test was conducted with a test setup of two pieces of Monel metal separated by an insulator of .005 inch thick of Mylar, another with a test setup of two pieces of cadmium separated also by an insulator of .005 inch of Mylar, and a third with a test setup of two pieces of cadmium and Monel metal also separated from each other by an insulator of .005 inch of Mylar. Each such test setup was submerged in distilled water, and in the third test setup using the dissimilar metals, the negative terminal of an external battery was connected to the Monel metal.

The following results were obtained. The dry resistance of the test setups made of similar metals separated by .005 inch of Mylar was in the range of megamegohms. The resistance when submerged in distilled water was about 1000 to 1500 ohms, and there was no voltage generated in either instance. The dry resistance of the test setup using Monel and cadmium separated by .005" of Mylar was also in the range of megamegohms. The resistance when submerged in distilled water was between 500 and 1000 ohms, and the amount of voltage generated varied from .15 to .5 volt. Thus, the voltage applied by the battery and the voltage from the test setup were additive.

Since the wet resistance in the third test setup was in the order of 500 to 1000 ohms, it must be assumed that there were impurities in the distilled water or on the pieces of metal themselves at the beginning, either due to handling or impurities in the air. The resistance of Mylar, when either wet or dry, is in the range of megamegohm, and therefore the impurities which are present have a sufficient number of ions to develop from .15 to .5 volt. Therefore, it is somewhat difficult to state exactly what ions would be present in the drop of water in actual usage of the rain sensor, since it will vary from location to location depending upon what is in the atmosphere. For example, if the location is in an area where a lot of coal is burned, then the electrolyte could be sulfuric acid. Similarly, if there is a large amount of carbon dioxide in the air, then the electrolyte could be carbonic acid. It must also be remembered that whatever salt forms the electrolyte, it could have been deposited on the rain sensor as dust carried by the winds, or could be deposited on the rain sensor due to handling, etc.

Referring now to Figure 2 of the drawings, another preferred embodiment of a rain sensor according to this invention will be described. The rain sensor generally includes a first metallic member 40 of cadmium provided with a shank 41 and head 42 of disk shape having a flat upper surface 43 and a flat lower surface 44. An insulating member 46 of nylon, Mylar, or polyethylene, and preferably from .002 to .005 inch thick, includes a tubular portion 48 receiving the shank 41 of member 40 and a flanged head 50 which is integral with the tubular portion 48 and receives head 42. The other metallic member 54 of Monel metal includes an annular shank 56 which receives the tubular portion 48 of member 46, and a circular head portion 58 integral therewith. The head portion 58 includes a circular bore 60 opening to the bore of shank 56 and receiving the head 42 of member 40 and the head 50 of member 46, as shown, whereby the upper flat surface 43 of head 42 is coplanar with the upper flat surface 62 of the head 58. The upper surface 62 of head 58 is joined to the lower flat surface 64 thereof by a generally circularly shaped outer edge portion 66. If desired, the shank 56 of member 54 may be threaded at 68 to provide a means for mounting the rain sensor on a suitable support.

The rain sensor of this embodiment of the invention works in the same manner as the rain sensor previously described to generate a voltage between members 40 and 54 when they are electrically connected. However, in order for the members 40 and 54 to be electrically connected, the drop of water or other moisture must fall on the annular exposed edge 70 of the flange of head 50 in order to bridge this edge of the insulating member 46 and electrically connect the members 40 and 54. If the drop of water or other moisture does not fall in this rather narrow limited area, the rain sensor does not operate. Thus, the rain sensor according to the first preferred embodiment of this invention offers several advantages over that according to the second preferred embodiment of this invention.

Thus, this invention provides an improved rain sensor for use in automatic vehicle top or window raising systems. For complete details of such a system which may include a rain sensor according to either preferred embodiment of this invention, reference may be had to copending application, S. N. 721,373, filed March 14, 1958, Onksen et al., and assigned to the assignee of this invention.

I claim:

1. A rain sensor comprising, a first metallic member having a spherically shaped upper surface, a second metallic member having a depression therein provided with a base wall and a side wall, said first member being located within said depression with said surface facing outwardly thereof and with the edge of said first member located in adjacent spaced relationship to said side wall of said depression whereby at least one drop of water falling on said surface of said first member will move to a position between said edge and side wall to bridge said first and second members, an insulating member located between said metallic members, the metallic material of each of said metallic members belonging to the group of metals known as the electromotive series, with the metallic materials being spaced from each other in this series so as to generate a voltage therebetween when the metallic members are bridged by said at least one drop of water.

2. A rain sensor comprising, a first metallic member, a second metallic member having a depression therein provided with a base wall and an outwardly flaring side wall, said first member being located within said depression with the edge thereof located in adjacent spaced relationship to said flaring side wall of said depression whereby at least one drop of water falling on said flaring side wall will move to a position between said edge and side wall to bridge said first and second members, an insulating member located betwen said metallic members, the metallic material of each of said metallic members belonging to the group of metals known as the electromotive series, with the metallic materials being spaced from each other in this series so as to generate a voltage therebetween when the metallic members are bridged by said at least one drop of water.

3. A rain sensor comprising, a first metallic member having a spherically shaped upper surface, a second metallic member having a depression therein provided with a base wall and an outwardly flaring side wall, said first member being located within said depression with said surface facing outwardly thereof and with the edge of said first member located in spaced relationship to said side wall of said depression whereby at least one drop of water falling on either said surface of said first member or said side wall will move to a position between said edge and side wall to bridge said first and second members, an insulating member located between said metallic members, the metallic material of each of said metallic members belonging to the group of metals known as the electromotive series, with the metallic materials being spaced from each other in this series so as to generate a voltage therebetween when the metallic members are bridged by said at least one drop of water.

4. A rain sensor comprising, a first annular metallic member having a spherically shaped upper surface, a second metallic member having a depression therein provided with an annular base wall larger than said annular member and an outwardly flaring side wall, said first member being located within said depression with said surface facing outwardly thereof and with the edge of said first member located above said base wall and in spaced relationship to said side wall of said depression whereby at least one drop of water falling either on said surface of said first member or said side wall will move to a position on said base wall to bridge said first and second members, an insulating member located between said metallic members, the metallic material of each of said metallic members belonging to the group of metals known as the electromotive series, with the metallic materials being spaced from each other in this series so as to generate a voltage therebetween when the metallic members are bridged by said at least one drop of water.

References Cited in the file of this patent

UNITED STATES PATENTS

| | | |
|---|---|---|
| 2,215,213 | Ellis | Sept. 17, 1940 |
| 2,593,252 | Booth | Apr. 15, 1952 |
| 2,617,972 | Nutter | Nov. 11, 1952 |
| 2,640,958 | Davis | June 2, 1953 |
| 2,675,227 | Baird et al. | Apr. 13, 1954 |
| 2,727,082 | Chubb et al. | Dec. 13, 1955 |
| 2,731,588 | McLeod | Jan. 17, 1956 |
| 2,748,687 | Ballard | June 5, 1956 |
| 2,851,510 | Pauli | Sept. 9, 1958 |

OTHER REFERENCES

Metal Finishing, April 1952, page 89.